United States Patent
Wei

(10) Patent No.: US 10,407,877 B2
(45) Date of Patent: Sep. 10, 2019

(54) METHOD AND SYSTEM FOR CONTROLLING A MACHINE OPERATING AT A WORKSITE

(71) Applicant: Caterpillar Inc., Peoria, IL (US)

(72) Inventor: Mo Wei, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 261 days.

(21) Appl. No.: 15/597,228

(22) Filed: May 17, 2017

(65) Prior Publication Data

US 2018/0335784 A1 Nov. 22, 2018

(51) Int. Cl.
| | | |
|---|---|---|
| *E21C 41/26* | (2006.01) | |
| *E02F 9/26* | (2006.01) | |
| *G05D 1/00* | (2006.01) | |
| *E02F 9/20* | (2006.01) | |
| *E02F 3/76* | (2006.01) | |

(52) U.S. Cl.
CPC .............. *E02F 9/261* (2013.01); *E02F 9/205* (2013.01); *E02F 9/2054* (2013.01); *E02F 9/262* (2013.01); *G05D 1/0011* (2013.01); *E02F 3/7604* (2013.01); *G05D 2201/0202* (2013.01)

(58) Field of Classification Search
CPC combination set(s) only.
See application file for complete search history.

(56) References Cited

U.S. PATENT DOCUMENTS

| 8,706,363 | B2 | 4/2014 | Stratton et al. | |
|---|---|---|---|---|
| 9,163,384 | B2 | 10/2015 | Stratton et al. | |
| 2012/0139325 | A1* | 6/2012 | Norberg | E21C 41/26 299/10 |

FOREIGN PATENT DOCUMENTS

CN 104763429 7/2015

* cited by examiner

*Primary Examiner* — Thomas G Black
*Assistant Examiner* — Ana D Thomas
(74) *Attorney, Agent, or Firm* — Harrity & Harrity LLP

(57) ABSTRACT

A method for controlling a machine operating at a worksite is provided. The worksite includes a pit region having a crest node and a low wall. The low wall is an incline having a positive slope. The method includes identifying a location of the crest node and activating a low wall detection module at the location of the crest node as the machine moves past the crest node towards the pit region. The low wall detection module is operable within a defined low wall detection gap to detect the low wall.

20 Claims, 8 Drawing Sheets

METHOD AND SYSTEM FOR CONTROLLING A MACHINE OPERATING AT A WORKSITE

TECHNICAL FIELD

The present disclosure generally relates to a machine. More particularly, the present disclosure relates to a method and system for controlling a machine operating at a worksite.

BACKGROUND

Machines, such as, autonomous or semi-autonomous machines, are becoming increasingly desirable for performing operations at a worksite, such as mining, earthmoving, etc. In some instances, a remotely located operator may control the operations of the semi-autonomous machines. In other instances, the autonomous machines may operate with human control or intervention, except upon the occurrence of some predefined events. One example of such autonomous or semi-autonomous machines is a dozer operating at a mining worksite to move earth material.

A mining worksite may include one or more terrain features, such as high walls, pit regions, low walls, etc. which may develop over a period of time. Detection of such terrain features and controlling operations of the machine based on these terrain features is an important aspect for operating the machine at the worksites. For example, during a dozing operation at a mining worksite, the dozer may be required to push earth material into a pit region. In such an operation, it is important to detect the pit region to know where to deposit the earth material and to detect a low wall at the end of the pit region to know when to end the dozing operation. A low wall may be an incline having a steep positive slope which may be encountered by the machine after the pit region is filed with the earth material. Additionally, without detection of such low wall, the machine may continue to move towards the low wall and may end up getting stuck at the low wall.

Chinese Patent No. 104763429 (hereinafter referred to as the '429 patent) relates to a method and an apparatus of adjusting opencast coal mine production stripping ratio. The method obtains an advanced area, in which the natural stripping ratio is intensively changed in an advancing direction of an original mining pit; performs grooving and deepening in the advanced area to form an advanced stripping pit, wherein a minimum earth surface distance between the advanced stripping pit and the original mining pit is calculated according to a preset distance calculating formula; and performs coal mining in a manner of synchronization advancing and deepening of the original mining pit and the advanced stripping pit.

SUMMARY OF THE INVENTION

According to an aspect of the present disclosure, a method for controlling a machine operating at a worksite is provided. The worksite includes a pit region having a crest node and a low wall. The low wall is an incline having a positive slope. The method includes identifying a location of the crest node and activating a low wall detection module at the location of the crest node as the machine moves past the crest node towards the pit region. The low wall detection module is operable within a defined low wall detection gap to detect the low wall.

According to another aspect of the present disclosure, a control system for controlling a machine operating at a worksite is provided. The worksite includes a pit region having a crest node and a low wall. The low wall is an incline having a positive slope. The control system includes a low wall detection module configured to detect the low wall based on one or more machine parameters. The control system further includes a controller communicably coupled to the low wall detection module. The controller is configured to identify a location of the crest node and activate a low wall detection module at the location of the crest node as the machine moves past the crest node towards the pit region. The low wall detection module is operable within a defined low wall detection gap to detect the low wall.

In a yet another aspect of the present disclosure, a machine is provided. The machine is configured to operate at a worksite including a pit region having a crest node and a low wall. The low wall is an incline having a positive slope. The machine includes a crest detection module configured to detect the crest node based on one or more machine parameters. The machine further includes a low wall detection module configured to detect the low wall based on one or more machine parameters. The machine further includes a controller communicably coupled to the crest detection module and the low wall detection module. The controller is configured to identify a location of the crest node and activate a low wall detection module at the location of the crest node as the machine moves past the crest node towards the pit region. The low wall detection module is operable within a defined low wall detection gap to detect the low wall

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
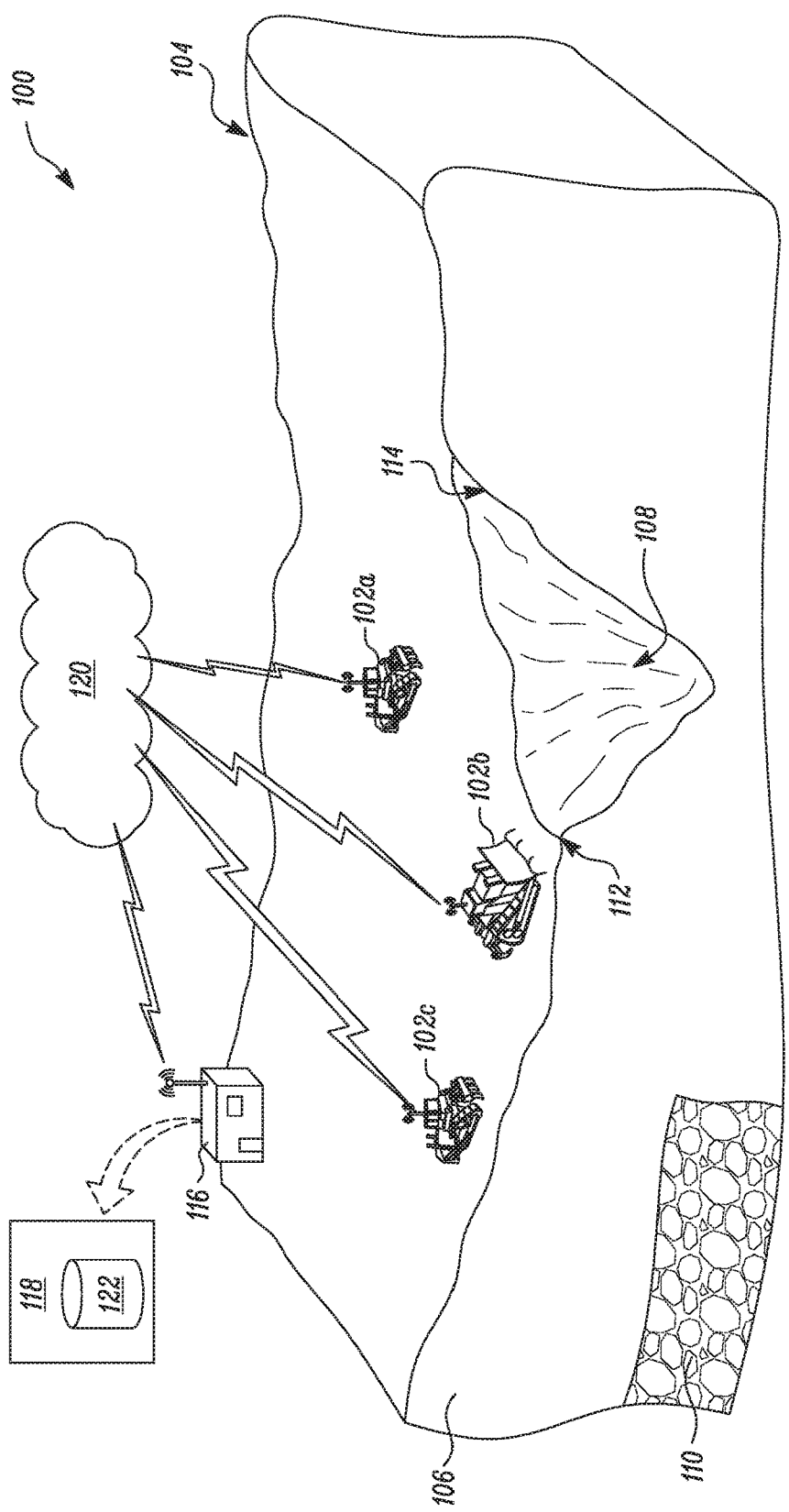
FIG. 1 illustrates a diagrammatic representation of an exemplary worksite including one or more machines performing operations, in accordance with the concepts of the present disclosure.

The present disclosure relates to a system and method for controlling operation of a machine operating at a worksite. FIG. 1 illustrates a diagrammatic representation of an exemplary worksite 100, at which one or more machines 102a, 102b, and 102c (hereinafter referred to as the machine 102) may operate in an autonomous, semi-autonomous or manual mode to perform one or more predetermined tasks. The worksite 100 may be a mining site, a landfill, a quarry, a construction site, or any other worksite where the machine 102 may perform an earthmoving operation.

The machine 102 may be a mobile machine configured to perform earth moving operations associated with industries related to mining, construction, farming or the like. For example, the machine 102 may be a dozer, an excavator, a dump truck and/or any other machines capable of performing earth moving operations at the worksite 100. For the purposes of the ongoing description, the worksite 100 is described and depicted as a mining site and the machine 102 is depicted and described as a dozer having blades or other implements configured to move earth material at the worksite 100. In an embodiment of the present disclosure, the machine 102 may be operating in a semi-autonomous mode, where an operator of the machine 102 is located at a remote location outside the machine 102. Alternatively, the machine 102 may operate in a fully autonomous mode or in a manual mode.

The worksite 100 may include one or more work areas, such as work area 104 based on the type of predetermined tasks being performed by the machine 102. The predetermined tasks may include earth moving operations to alter the geography of the worksite 100. Examples of the tasks performed by the machine 102 may include, but not limited to, a dozing operation, a grading operation, a levelling operation, or any other earth moving operation that may result in geographical modifications to define one or more terrain features within the worksite 100. For the purposes of this description, the worksite 100 is depicted to include only one work area 104 where the machine 102 is configured to perform a dozing operation. The machine 102 has been further described in conjunction with FIG. 3.

The work area 104 may include one or more terrain features, such as an overburden region 106 and a pit region 108. The overburden region 106 may correspond to a region where the earth material lays on top of a mineral ore layer 110. The pit region 108 corresponds to a region where the earth material (removed from the overburden region 106) is pushed and deposited. The machine 102 is configured to scrap the earth material from the overburden region 106 and push it inside the pit region 108 to fill the pit region 108. The work area 104 of the worksite 100 is further depicted and described in more detail with respect to FIG. 2.

Figure 2:
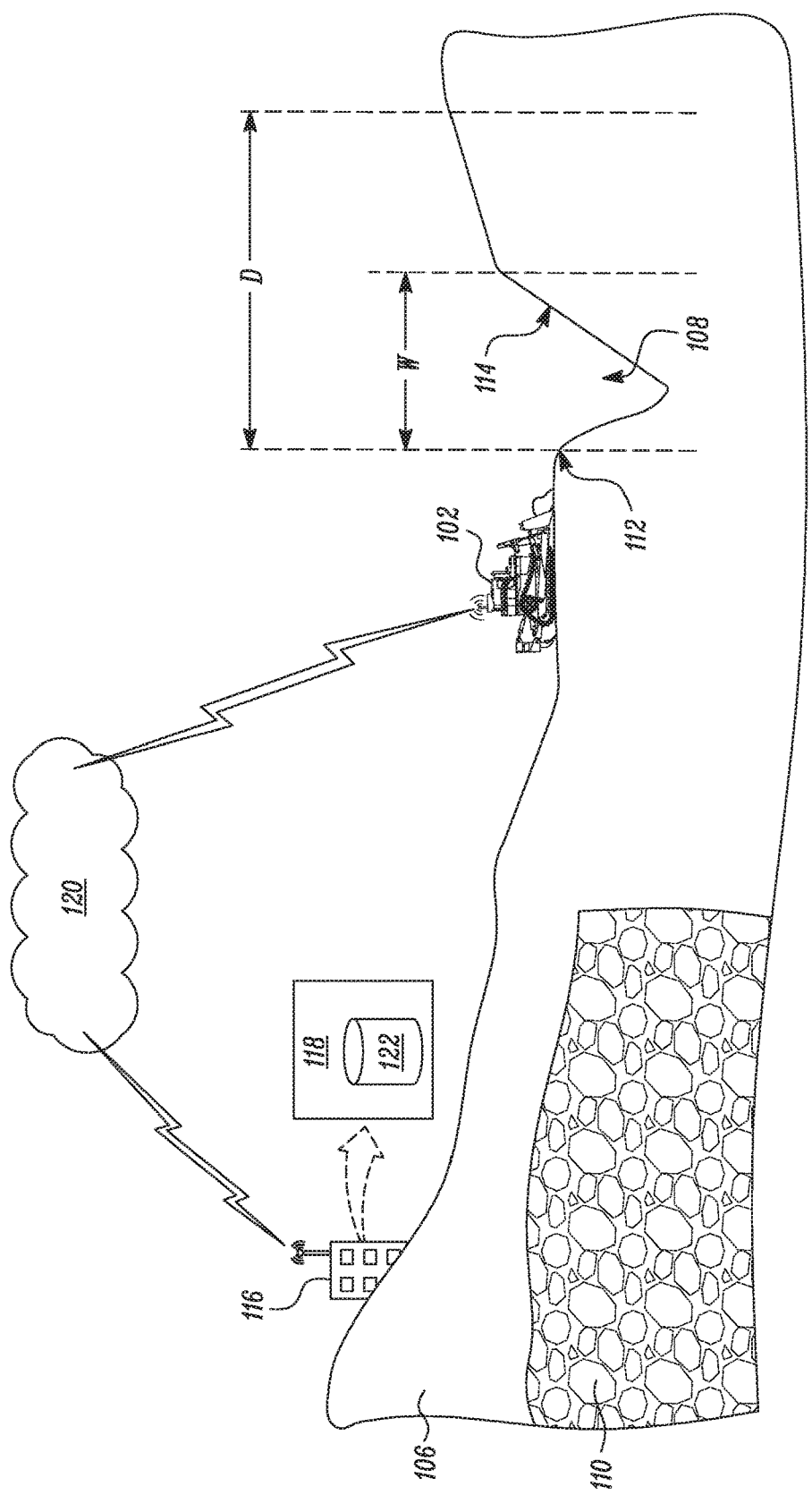
FIG. 2 illustrates a two-dimensional view of a work area of the worksite, in accordance with the concepts of the present disclosure.

FIG. 2 illustrates a two-dimensional representation of the exemplary work area 104, where the machine 102 operates to fill the pit region 108. The pit region 108 may include a crest node 112 defining an edge of the pit region 108, beyond which the machine 102 moves only for a very small distance to deposit the earth material into the pit region 108. The pit region 108 further includes a low wall 114, which is an incline having a steep positive slope. According to an embodiment of the present disclosure, the machine 102 operates to perform a dozing operation, i.e., push the earth material from the overburden region 106 to fill the pit region 108 and stops the dozing operation when the low wall 114 is detected after the pit region 108 is filled completely.

Referring collectively to FIGS. 1 and 2, according to an embodiment of the present disclosure, an operator is configured to monitor and control the operations of the machine 102 at the worksite 100 through a remote operator station 116. The remote operator station 116 may include a remote server 118 configured to transmit/receive data from the machine 102 via a communication network 120 in order to monitor and control the operation of the machine 102. The remote server 118 may be implemented using any known application server such as, for example, Apache Application Server™, IBM Web Sphere™, and/or the like. The remote operator station 116 may also include a control panel (not shown) for operating the machine 102. The control panel may include physical controls/levers and/or touchscreens, etc. to transmit and receive the data to monitor and control the operations of the machine 102.

The remote server 118 may further include a database 122 configured to store various information associated with the worksite 100 and the machine(s) 102. For example, the database 122 may store map of the worksite 100, the location of the machine(s) 102 at the worksite 100, information related to the various terrain features of the worksite 100, etc. It may be contemplated that the database 122 described herein may be an internal and/or external database and may include data repositories, or other data sources. In some embodiments, the database 122 may be implemented using a relational database, such as Sybase, Oracle, Code-Base and Microsoft® SQL Server as well as other types of databases such as, for example, a flat file database, an entity-relationship database, and object-oriented database, a record-based database, or the like.

Figure 3:
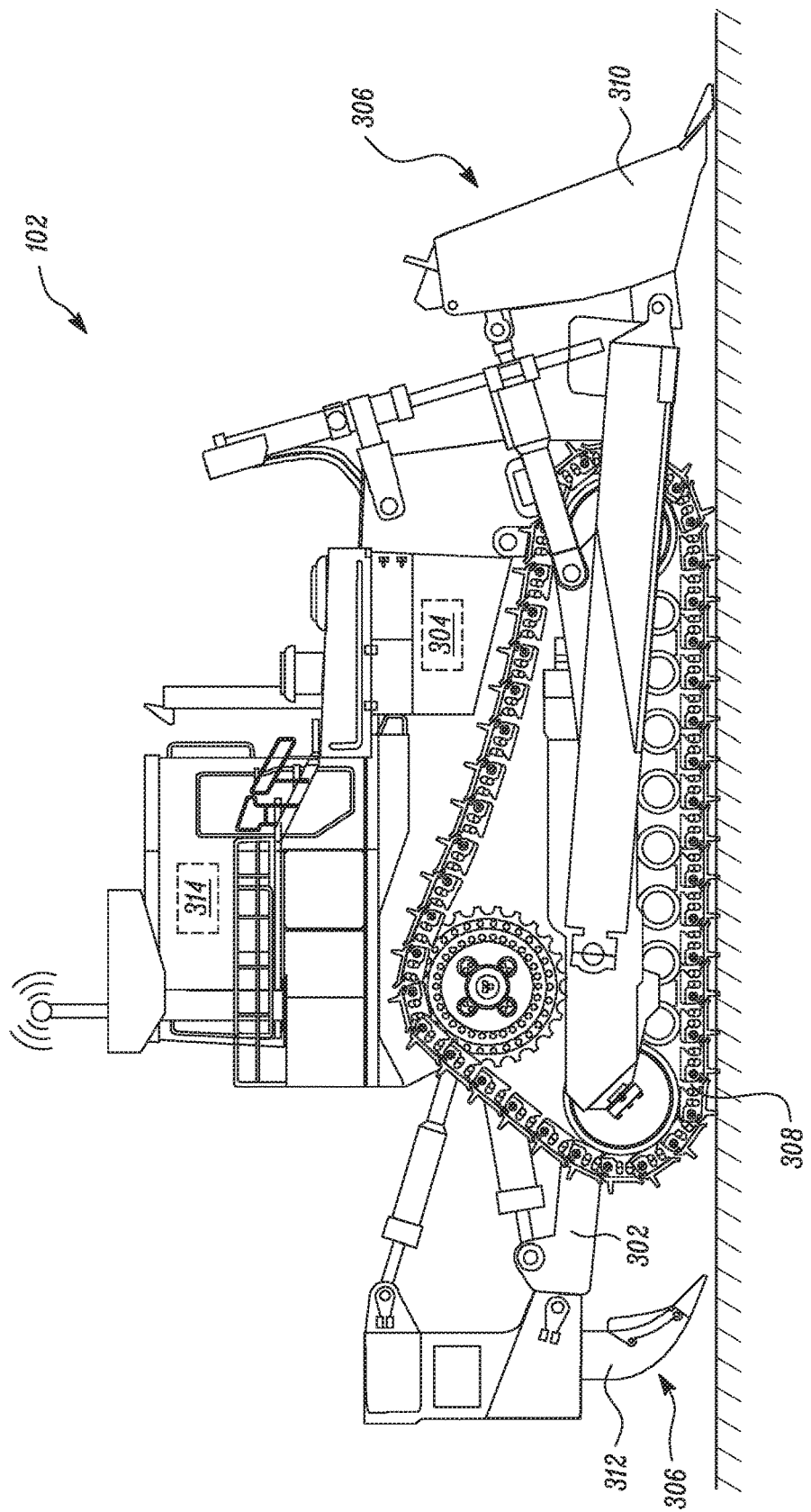
FIG. 3 illustrates the exemplary machine, in accordance with the concepts of the present disclosure.

FIG. 3 illustrates an exemplary machine 102 according to an embodiment of the present disclosure. The machine 102 may include an undercarriage 302, an engine 304, and implements 306. The undercarriage 302 may include one or more traction devices 308 that are powered by the engine 304 to propel the machine 102 at the worksite 100. In an example, the traction devices 308 are depicted as a set of crawler tracks. Alternatively, the traction devices 308 may include any component, such as wheels, that enable the machine 102 to move from one place to another at the worksite 100.

The engine 304 may also be configured to power various auxiliary equipment's of the machine 102, including the implements 306 for performing work at the worksite 100. The implements 306 may include a blade, a bucket, a ripper, a hammer, a grapple or any other suitable implements. In the illustrated embodiment, two implements are attached to the machine 102. One of the implement 306 is a blade 310 attached to a front of the machine 102 while the other implement 306 is a ripper 312 attached to a rear of the machine 102.

The machine 102 further includes a control system 314 configured to control the operations of the machine 102. The control system 314 may include suitable logic, circuitry, and/or interfaces that are configured to control the various operations of the machine 102 in the worksite 100. It may be contemplated that control system 314 may be implemented using an engine control module (ECM) of the machine 102. In an embodiment of the present disclosure, the control system 314 is configured to communicate with the remote operator station 116 via the communication network 120 to facilitate remote controlling and monitoring of the operations of the machine 102.

Figure 4:
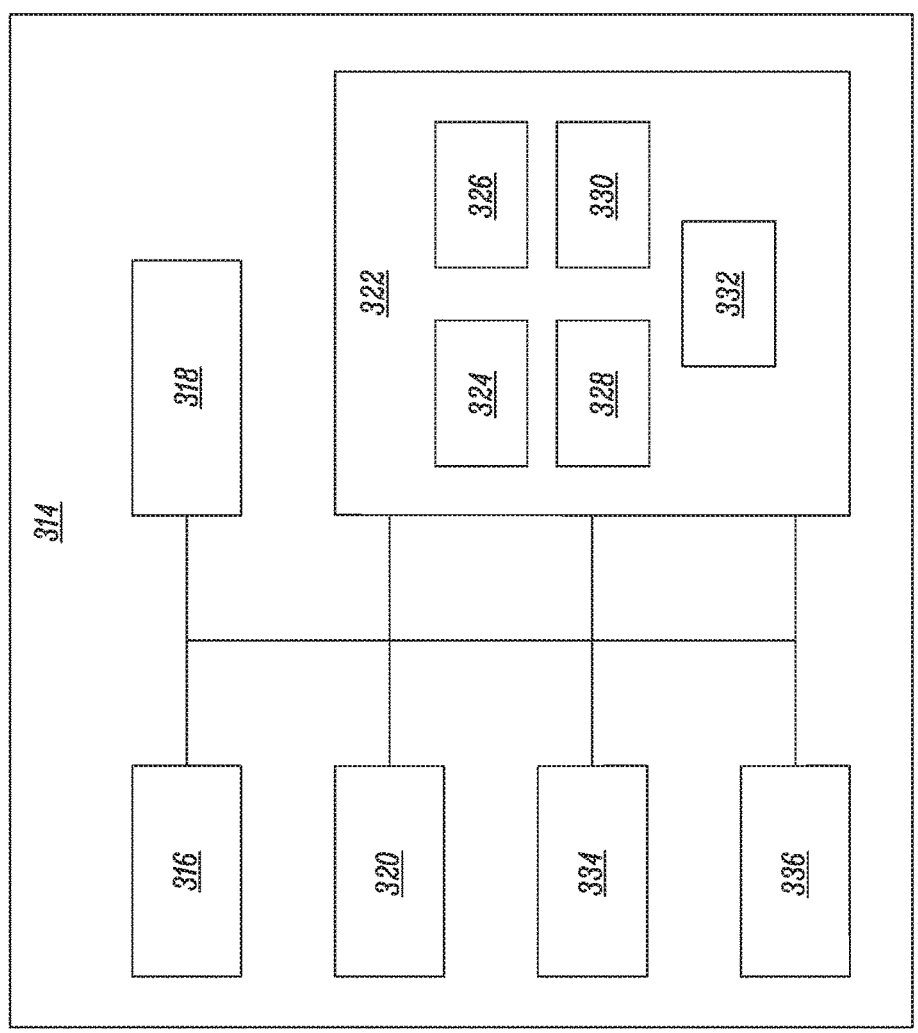
FIG. 4 illustrates a block diagram of a control system of the machine, in accordance with the concepts of the present disclosure.

The control system 314 includes a controller 316, a memory unit 318, a transceiver 320 and one or more machine sensors 322, as illustrated in FIG. 4. It may be contemplated that the scope of the disclosure is not limited to include the control system 314 in the machine 110. In an alternative embodiment, the control system 314, or portions of the control system 314, may be included in the remote operator station 116, without departing from the scope of the disclosure.

In an embodiment, the controller 316 is communicably coupled to the memory unit 318, the transceiver 320, and the one or more machine sensors 322. The controller 316 is configured to execute the instruction stored in the memory unit 318 to perform predetermined operation. For example, the controller 316 may be configured to control the operation of the machine 102 in the work area 104 and the worksite 100. The controller 316 may be implemented using one or more controller technologies such as an Application Specific Integrated Circuit (ASIC).

The memory unit 318 stores a set of instructions that are executable by the controller 316 to perform the predetermined operation (for example, controlling the operation of the machine 102). Some of the commonly known memory device implementations include, but are not limited to, a random access memory (RAM), a read only memory (ROM), a hard disk drive (HDD), and a secure digital (SD) card.

The transceiver 320 transmits and receives messages and data to/from various devices/machines operating at the worksite 100 (e.g., the remote operator station 116 and/or the remote server 118) over the communication network 120. The transceiver 320 transmits and receives data/messages in accordance with the various communication protocols, such as, TCP/IP, UDP, and 2G, 3G, or 4G communication protocols.

The one or more machine sensors 322 may be provided on the machine 102 and communicably coupled to the controller 316. For example, the machine 102 may include a location sensor 324 configured to determine and communicate a position and/or orientation of the machine 102 relative to the worksite 100, to the controller 316. In an example, the location sensor 324 may include a Global Positioning System (GPS) device positioned on the machine 102. The machine 102 may further include an implement sensor 326, an engine sensor 328, a slip sensor 330 and a resistance sensor 332 communicably coupled to the controller 316 and configured to detect and communicate the one or more machine parameters to the controller 316.

For example, the implement sensor 326 may be provided on the implement 306 and configured to determine the position and/or orientation information of the implement 306. The engine sensor 328 may be configured to measure the torque produced by the engine 304 of the machine 102. Further, the slip sensor 330 may be configured to measure the slip factor of the machine 102, i.e., the relative movement of the machine 102 with respect to the ground relative to speed produced by the engine 304 of the machine 102. Moreover, the resistance sensor 332 may be configured to measure a resistance of the machine 102 with respect to the ground during movement of the machine 102 at the worksite 100. It may be contemplated that the machine 102 may include many other sensors, which are not depicted and described herein for the sake of brevity of the disclosure. A person having ordinary skill in the art would appreciate that the machine 102 may also include other sensors including, but not limited to, an accelerometer, a gyroscope, a light detection and ranging (LIDAR) sensor, a perception sensor, a mono camera sensor, a stereo camera sensor, or a three-dimensional (3D) radar sensor.

In an embodiment of the present disclosure, the control system 314 includes a crest detection module 334 and a low wall detection module 336. The crest node detection module 334 is configured to detect the crest node 112 of the pit region 108 at the worksite 100, based on one or more machine parameters. Further, the low wall detection module 336 is configured to detect the low wall 114 of the pit region 108 at the worksite 100, based on one or more machine parameters.

The crest detection module 334 is configured to detect the crest node 112 based on one or more sensed machine parameters. For example, the crest detection module 320 may be communicably coupled to the one or more machine sensors 322 to receive one or more sensed machine parameters. In an embodiment of the present disclosure, the crest node detection may be based on the resistance of the machine 102. For example, as the machine 102 moves towards the pit region 108 and pushes the earth material, a resistance of the machine 102 increases with an increase in the amount of the earth material being carried by the implement 306 of the machine 102. As the earth material falls inside the pit region 108, the resistance of the machine decreases as the earth material falls inside the pit region 108. This sudden fall in the measured resistance may indicate the crest node 112 of the pit region 108, beyond which the machine 102 may only move a small distance until the entire earth material carried by the implement 306 is pushed inside the pit region 108. Therefore, the crest detection module 334 detects the crest node 112 in response to the sudden drop in the resistance of the machine 102 measured by the resistance sensor 332. It may be contemplated that the crest node detection may also be based on other machine parameters, such as torque, slip etc., and that the present disclosure is not intended to be limited to the crest node detection being based only on the resistance of the machine 102.

The crest detection module 334 may communicate the detected crest node 112 to the controller 316. The controller 316 is further configured to determine and communicate a location information associated with the detected crest node 112 to the database 122 of the remote server 118. For example, the controller 316 may communicate with the location sensor 324 of the machine 102 to identify the location of the machine 102 when the crest node 112 is detected. The determined location of the machine 102 at the crest node 112 may be stored as the location of the crest node 112 at the worksite 100. It may be contemplated that any other method to identify the location information of the crest node 112 may also be used without departing from the scope of the present disclosure. In an embodiment of the present disclosure, the location information of the crest node 112 may be stored in the database 122. Alternatively, the memory unit 318 of the machine 102 may also store the location information associated with the crest node 112.

In an embodiment of the present disclosure, the low wall detection module 336 may be configured to detect the low wall 114 based on one or more machine parameters sensed by the one or more machine sensors 322. For example, the low wall detection module 336 detects the low wall 114 based on the resistance of the machine 102 measured by the resistance sensor 332. However, it may be contemplated that the present disclosure is not intended to be limited to the low wall detection based only on the resistance of the machine 102 and that other machine parameters may also be used to detect the low wall 114.

In an exemplary embodiment of the present disclosure, the low wall detection module 336 may communicate with the resistance sensor 332 to receive the measured resistance of the machine 102. The low wall detection module 336 may compare the measured resistance with a threshold value and detect the low wall 114 when the measured resistance is greater than the threshold value. The controller 316 is further configured to detect a location of the low wall 114 and communicate it to the database 122 for storage. It may be contemplated that the low wall detection may also be based on other machine parameters, such as torque, slip etc., and that the present disclosure is not intended to be limited to the low wall detection being based only on the resistance of the machine 102.

As explained previously, the controller 316 is communicably coupled to the crest detection module 334 and the low wall detection module 336. In an embodiment of the present disclosure, the controller 316 is configured to identify the location data associated with of the crest node 112 and activate the low wall detection module at the location of the crest node 112, the low wall detection module 336 being operable within a low wall detection gap D (shown in FIG. 2). The low wall detection module 336, when operable, is configured to detect the low wall 114.

In an exemplary embodiment of the present disclosure, the low wall detection gap D may be predefined by the operator such that a length of the low wall detection gap D extending from the crest node 112, is greater than a width of the pit region 108 measured in a direction of travel of the machine 102. In one example, the width W of the pit region 108 may be predefined in the map of the worksite 100 stored within the database 122. Where there are multiple pit regions 108 at the worksite 100, the width of the pit regions may be pre-stored in the database 122. In such a scenario, the operator may set the low wall detection gap D as a huge distance which would be significantly greater than the maximum width or the average width of all the pit regions 108 in the worksite 100. For example, where the average pit region width is 80 meters for most of the pit regions 108 at the worksite 100, the operator may set the low wall detection gap D as 100 meters or more, within which the low wall detection module 336 would be activated. Further, the low wall detection gap D remains in a deactivated state before the crest node 112 and outside the low wall detection gap D.

Further, when the pit region 108 is completely filled and the low wall 114 is detected, the controller 316 is configured to identify the location of the detected low wall 114. For example, the location sensor 324 may detect the location information of the machine 102 when the low wall 114 is detected and store this location of the machine 102 as the location of the low wall 114 in the database 122.

The controller 316 is also configured to provide an alert or a signal to an output device, such as an output device provided on the machine 102 or in the remote operator station 116 when the low wall 114 is detected. The operator stationed at the remote operator station 116 may then signal the machine 102 to halt the operation and return to a parking area of the worksite 100. Alternatively, the controller 316 may signal the control system 314 of the machine 102 to halt the operation when the low wall 114 is detected.

It may be contemplated by a person having ordinary skill in the art, that the foregoing description is not intended to be limiting to the dozing operation of the machine 102. For example, during backstacking void filing operation of the machine 102, the controller 316 may identify and/or retrieve a location data associated with the previously detected low wall 114 and activate the low wall detection module 336 at the location of the previously detected low wall 114. In this scenario as well, the low wall detection module 336 is operable within the defined low wall detection gap D. In such a case, the low wall detection gap D is again a huge distance significantly greater than the width W of the pit region 108 or the average width W of the pit regions 108 at the worksite 100.

INDUSTRIAL APPLICABILITY

The present disclosure relates to method and system for controlling an operation of the machine 102 operating at the worksite 100. The worksite 100 includes a number of terrain features, such as the overburden region 106 and the pit region 108. The machine 102 is configured to detect the crest node 112 of the pit region 108 to push the earth material inside the pit region 108 and detect the low wall 114 to identify that the pit region 108 is completely filled and the dozing operation is completed.

Figure 5:
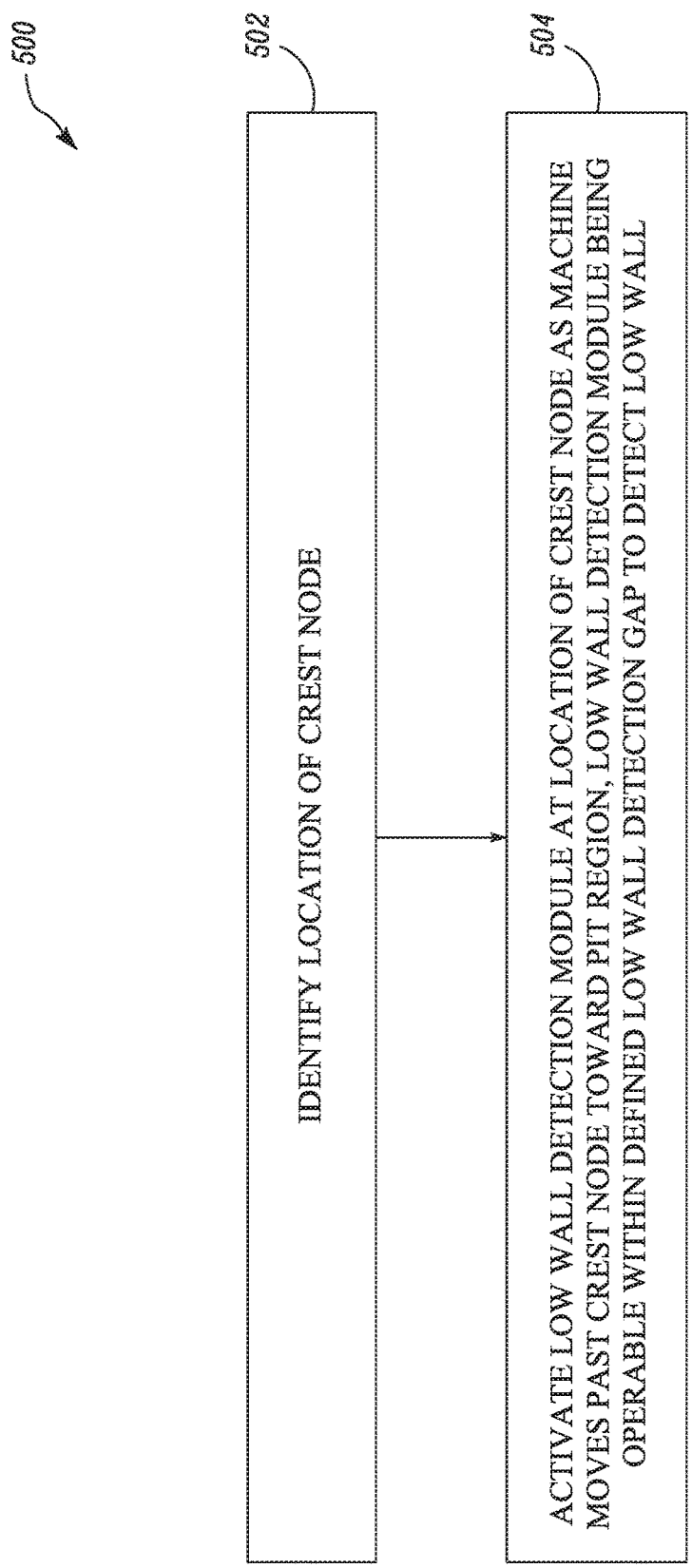
FIG. 5 illustrates an exemplary method for controlling the machine operating at the worksite, in accordance with the concepts of the present disclosure.
Figure 6:
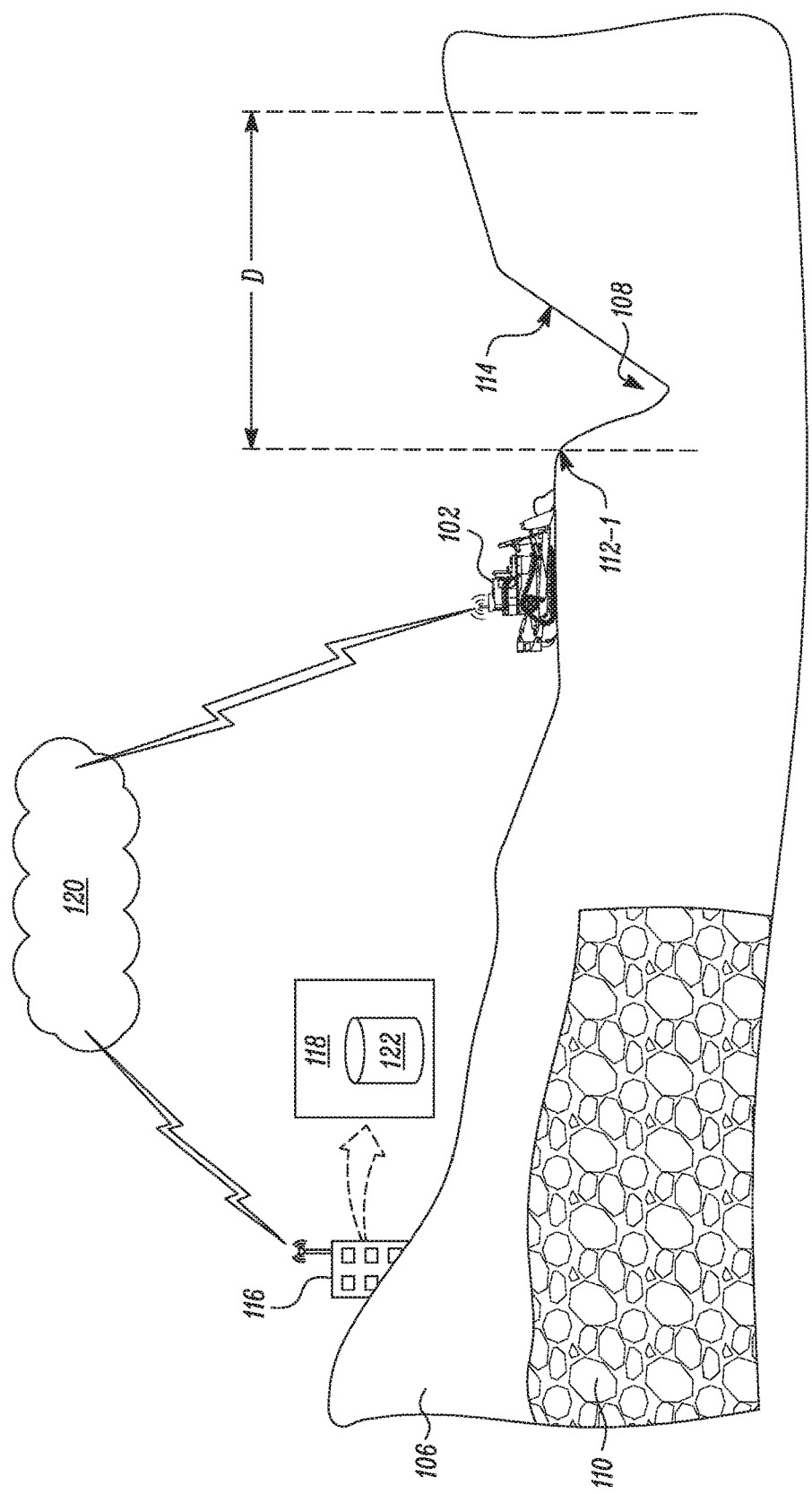
FIG. 6 illustrates a diagrammatic representation of an exemplary scenario of the machine performing a dozing operation at the worksite.
Figure 7:
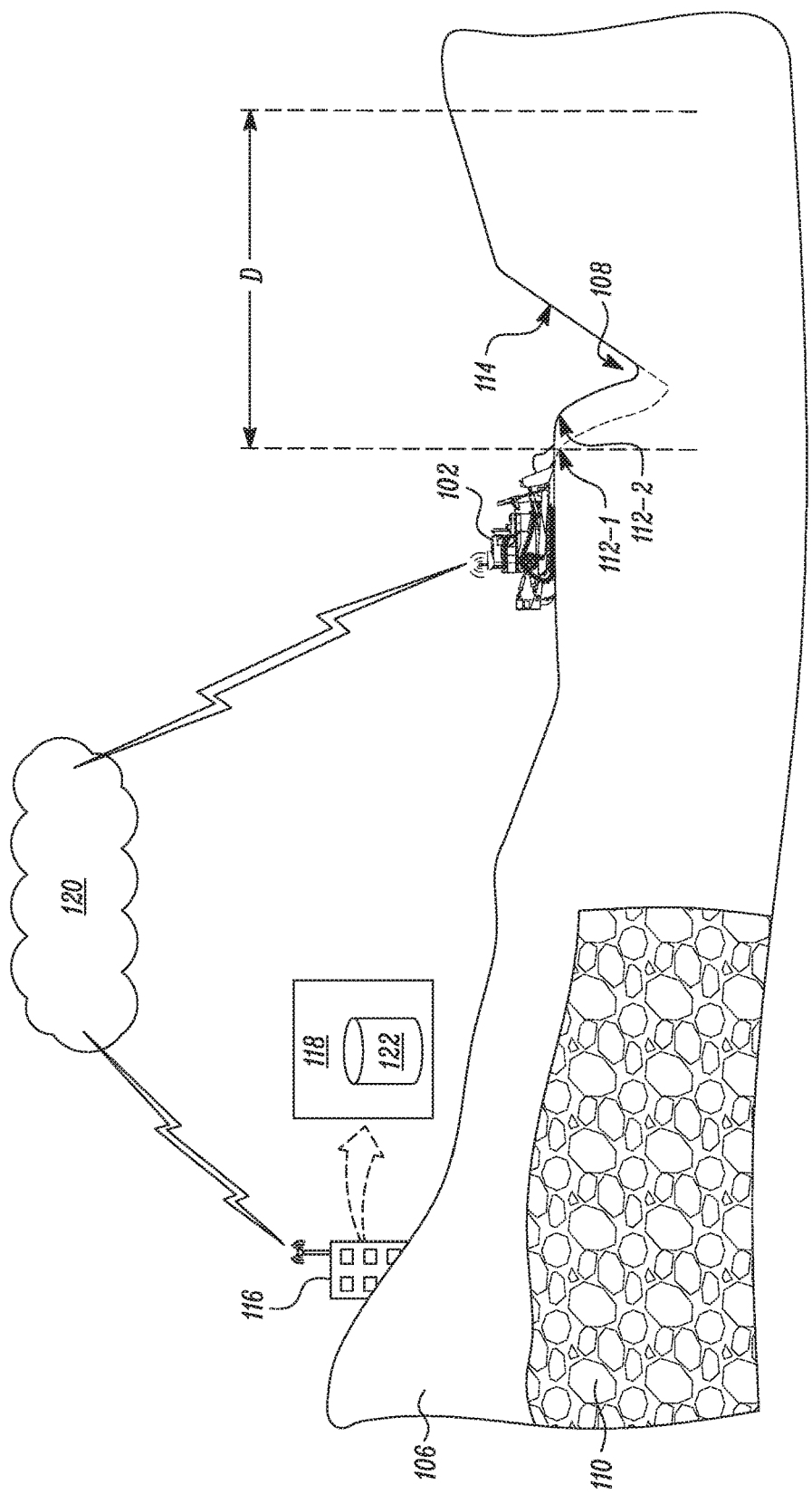
FIG. 7 illustrates a diagrammatic representation of the exemplary scenario of the machine performing the dozing operation at the worksite.
Figure 8:
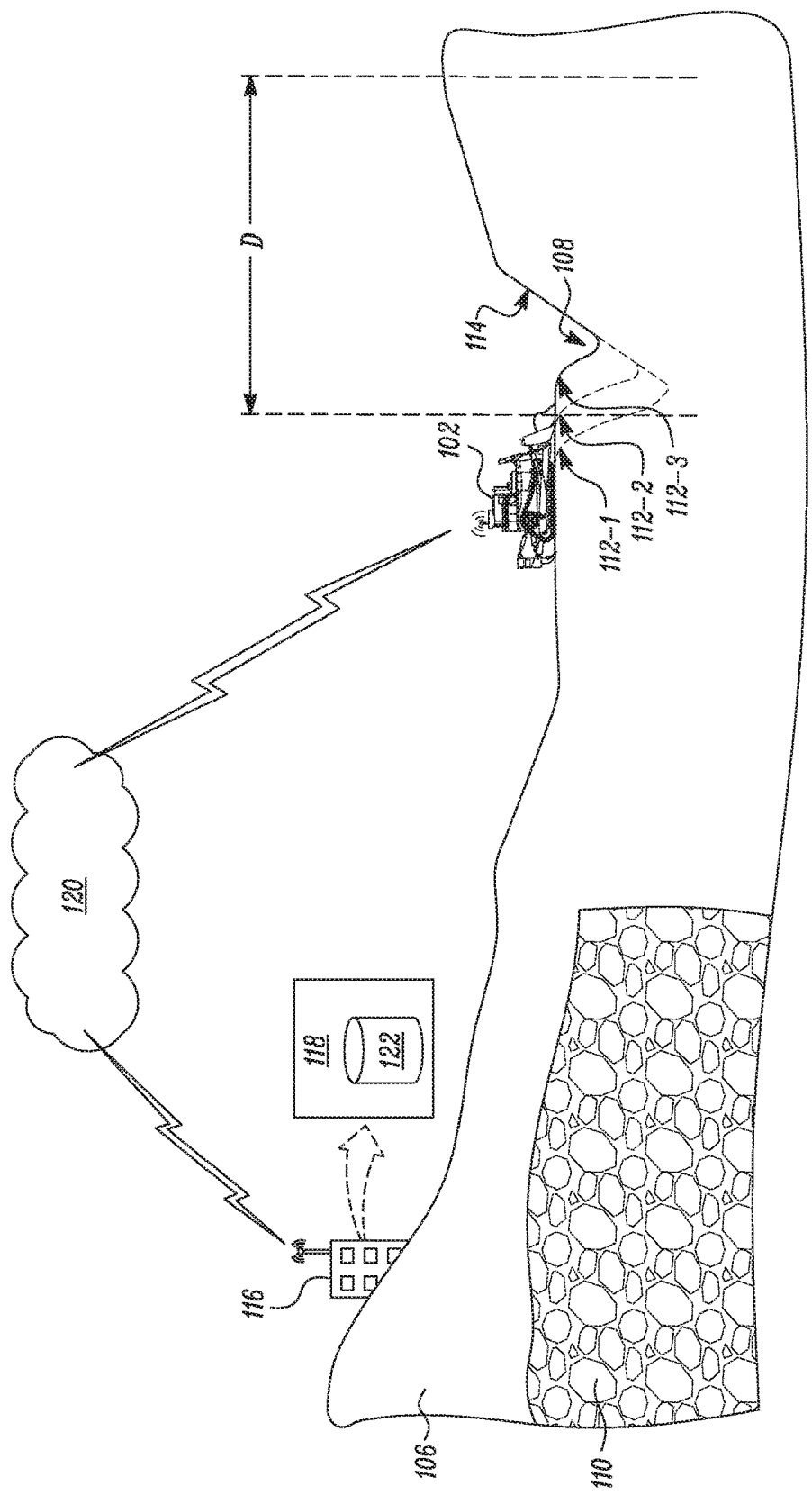
FIG. 8 illustrates a diagrammatic representation of the exemplary scenario of the machine performing the dozing operation at the worksite.

FIG. 5 illustrates an exemplary method 500 for controlling the machine 102 operating at the worksite 100. During operation, the machine 102 performs multiple cycles of dozing operation to push earth material to fill the pit region 108. FIGS. 6 to 8 illustrate multiple cycles of performing the dozing operation by the machine 102 at the worksite 100. When the machine 102 moves on the work area 104 to perform the dozing operation, the implement 306 pushes the earth material to be dumped inside the pit region 108. As the machine 102 approaches the pit region 108, the controller 316 identifies a location of the crest node 112 as the implement of the machine 102 moves past the crest node 112 towards the pit region 108 (step 502).

In an embodiment of the present disclosure, for the first cycle of dozing operation, as shown in FIG. 6, the controller 316 communicates with the crest node detection module 334 and the location sensor 324 to identify the location of the first crest node 112-1. The controller 316 further communicates with the remote server 118 and the database 122 to store the location of the first crest node 112-1. It may be contemplated that during the first cycle of dozing operation, the crest detection module 334 detects the first crest node 112-1 based on one or more machine parameters, such that resistance of the machine 102, sensed by one or more machine sensors 322, such as the resistance sensor 332.

At step 504, the low wall detection module 336 is activated by the controller 316 at the identified location of the crest node 112 such that the low wall detection module 336 remains active and operable within a defined low wall detection gap D. In an exemplary embodiment of the present disclosure, the low wall detection gap D may be predefined by the operator such that the length of the low wall detection gap D extending from the identified crest node 112, is greater than a width of the pit region 108 measured in a direction of travel of the machine 102. In one example, the width W of the pit region 108 may be predefined in the map of the worksite 100 stored within the database 122. Where there are multiple pit regions 108 at the worksite 100, the width of the pit regions may be pre-stored in the database 122. In such a scenario, the operator may set the low wall detection gap D as a huge distance which would be significantly greater than the maximum width or the average width of all the pit regions 108 in the worksite 100. Since, the low wall detection module 336 remains active only within the low wall detection gap D and remains deactivated outside the low wall detection gap D, the false alarms corresponding to incorrect detection of low wall 114 are reduced.

Now considering the first cycle of dozing operation of the machine 102, as shown in FIG. 6, the controller 316 activates the low wall detection module 336 at the location of the first crest node 112-1 detected by the crest node detection module 334. The low wall detection module 336 remains activated to detect the low wall 114 within the low wall detection gap D extending from the location of the crest node 112-1 up to a distance greater than the width W of the pit region 108 measured in the direction of travel of the machine 102 during the dozing operation. The low wall detection module 336, being in the active state within the low wall detection gap D, tries to detect the low wall 114. Since the pit region 108 is not yet filled completely, the low wall detection module 336 would not detect any low wall. Therefore, the machine 102 after dumping the earth material inside the pit region 108 would reverse to pick more earth material to perform the next cycle of the dozing operation. As the earth material is dumped into the pit region 108, the location of the crest node 112-1 may change.

Accordingly, for the subsequent cycles of the dozing operation, the controller 316 may identify the location data associated with the previously detected crest node 112, stored in the database 122, and activate the low wall detection module 336 at the previously detected crest node location for the low wall detection gap D. This means, for $n^{th}$ (n>1) cycle of dozing operation, the controller 316 is configured to retrieve the crest node location detected during the $(n-1)^{th}$ cycle of dozing operation and activate the low wall detection module 336 at the retrieved crest node location. Similar to the first cycle of dozing operation, the low wall detection module 336 remains active within the low wall detection gap D extending from the previously detected crest node and remains deactivated before the identified crest node location and outside the low wall detection gap D. In an exemplary embodiment, the low wall detection gap D remains constant throughout the multiple cycles of dozing operation, where the low wall detection gap D is predefined by the operator of the machine 102 before the start of the dozing operation of the machine 102 at the worksite 100.

For example, during the second cycle of the dozing operation of the machine 100, as shown in FIG. 7, the controller 316 communicates with the database 122 to retrieve the location of the previously detected crest node 112, i.e., the first crest node 112-1. The controller 316 further activates the low wall detection module 336 at the identified location of the previously detected crest node 112-1. In this case, the low wall detection gap D extends from the first crest node 112-1.

Further, as the machine 102 moves past the location of the previously detected crest node 112-1, the crest node detection module 334 may detect the changed location of the crest node, hereinafter referred to as the second crest node 112-2. The crest detection module 334 may communicate the detected updated location of the crest node 112-2 to the controller 316 which further communicates the updated second crest node 112-2 and the location of the second crest node 112-2 to the database 122. Now the database 122 is updated to store the updated to store the location of the second crest node 112-2.

Furthermore, during the third cycle of the dozing operation, the controller 316 communicates with the database 122 to retrieve the location of the previously detected crest node 112, i.e., the second crest node 112-2. The controller 316 further activates the low wall detection module 336 at the identified location of the previously detected second crest node 112-2. In this case, the low wall detection gap D extends from the second crest node 112-2.

Further, as the machine 102 moves past the location of the previously detected second crest node 112-2, the crest node detection module 334 may detect the changed location of the crest node 112-3, hereinafter referred to as the third crest node 112-3. The crest detection module 334 may communicate the detected updated location of the crest node 112-3 to the controller 316 which further communicates the location of the third crest node 112-3 to the database 122. Now the database 122 is further updated to store the updated location of the crest node 112-3.

When the machine 102 performs the last cycle of dozing operation, i.e, when the pit region 108 is almost filed and would be completely filled by the last cycle of dozing operation, the low wall detection module 336 would be activated by the controller 316 at the location of the previously detected crest node, such as the third crest node 112-3. Therefore, after the earth material is completely pushed to fill the pit region 108 completely, and as the implement 306 of the machine 102 moves past the detected crest node, i.e., the third crest node 112-3, the implement 306 is configured to encounter a raise in the resistance due to presence of the low wall 114. Since the low wall detection module 336 was activated at the location of the previously detected crest node, i.e., the second crest node 112-2, the low wall detection module 336 starts communicating with the one or more machine sensors 322, such as the resistance sensor 332 to detect the low wall 114. In an embodiment of the present disclosure, as the resistance measured by the resistance sensor 332 increases and crosses a predefined threshold value, the low wall detection module 336 detects the low wall 114 and communicates the detected low wall 114 to the controller 316.

The controller 316 is further configured to detect a location of the detected low wall 114 and communicate the detected location of the low wall 114 to the database 122 for storage. In an embodiment of the present disclosure, the controller 316 provides a signal to an output device, such as the output device provided in the remote operator station 116 when the low wall 114 is detected. Furthermore, the controller 316 is configured to signal the machine 102 to halt operation when the low wall 114 is detected. The machine 102, in response to the signal, may return to the parking area of the worksite 100. In an embodiment of the present disclosure, the signal may be in the form of a visual, audio, textual or any other form of alert signal.

While aspects of the present disclosure have been particularly shown, and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A method for controlling a machine operating at a worksite, the worksite including a pit region having a crest node and a low wall, the low wall being an incline having a positive slope, and the method comprising:
   identifying, by a controller of the machine, a location of the crest node; and
   activating, by the controller and at the location of the crest node, a detection of the low wall as the machine moves past the crest node towards the pit region, the detection of the low wall being operable within a defined low wall detection gap.

2. The method of claim 1, wherein a length of the defined low wall detection gap, extending from the crest node, is greater than a width of the pit region measured in a direction of travel of the machine.

3. The method of claim 1, wherein identifying the location of the crest node comprises retrieving flail location data, associated with the crest node, stored in a database.

4. The method of claim 1, further comprising:
 detecting, by the controller, the crest node based on one or more machine parameters sensed by one or more machine sensors; and
 determining and storing, by the controller, location data associated with the detected crest node in a database, wherein the location of the crest node is identified based on the location data.

5. The method of claim 1, further comprising:
 detecting, by the controller, the low wall based on one or more machine parameters sensed by one or more sensors; and
 signaling, by the controller, the machine to halt operation when the low wall is detected.

6. The method of claim 5, wherein the one or more machine parameters include one or more of machine torque, machine resistance, or implement load.

7. The method of claim 5, further comprising:
 communicating, by the controller, information regarding the detected low wall to an output device.

8. The method of claim 1, further comprising:
 determining and storing, by the controller, location data associated with the detection of the low wall.

9. A control system for controlling a machine operating at a worksite, the worksite including a pit region having a crest node and a low wall, the low wall being an incline having a positive slope, and the control system comprising:
 a memory; and
 a controller, communicably coupled to the memory, configured to:
  identify a location of the crest node; and
  activate, at the location of the crest node, a detection of the low wall as the machine moves past the crest node toward the pit region, the detection of the low wall being operable within a defined low wall detection gap.

10. The control system of claim 9, wherein a length of the defined low wall detection gap, extending from the crest node, is greater than a width of the pit region measured in a direction of travel of the machine.

11. The control system of claim 9, wherein, when identifying the location of the crest node, the controller is configured to:
 retrieve flail location data, associated with the crest node, stored in a database.

12. The control system of claim 9, wherein the controller is further configured to:
 detect the crest node based on one or more machine parameters sensed by one or more machine sensors; and
 determine and store location data, associated with the detected crest node, in a database.

13. The control system of claim 9, wherein the controller is further configured to:
 detect the low wall based at least on one or more machine parameters sensed by one or more sensors; and
 signal the machine to halt operation when the low wall is detected.

14. The control system of claim 13, wherein the one or more machine parameters include one or more of machine torque, machine resistance, or implement load.

15. The control system of claim 13, wherein the controller is further configured to:
 communicate information regarding the detected low wall to an output device.

16. The control system of claim 13, wherein the controller is further configured to:
 determine and store location data associated with the detected low wall.

17. A machine configured to operate at a worksite, the worksite including a pit region having a crest node and a low wall, the low wall being an incline having a positive slope, and the machine comprising:
 one or more sensors to identify one or more machine parameters; and
 a controller communicably coupled to the one or more sensors, the controller being configured to:
  identify a location of the crest node; and
  activate, at the location of the crest node, a detection of the low wall as the machine moves past the crest node toward the pit region, the low wall being detected based on the one or more machine parameters, and the detection of the low wall being operable within a defined low wall detection gap.

18. The machine of claim 17, wherein a length of the defined low wall detection gap, extending from the crest node is greater than a width of the pit region.

19. The machine of claim 17, wherein, when identifying the location of the crest node, the controller is configured to:
 retrieve flail location data, associated with the crest node, stored in a database.

20. The machine of claim 17, wherein the controller is further configured to:
 signal the machine to halt operation when the low wall is detected.

* * * * *